June 23, 1925.
W. E. GREENAWALT
METALLURGICAL PROCESS
Filed Jan. 31, 1924
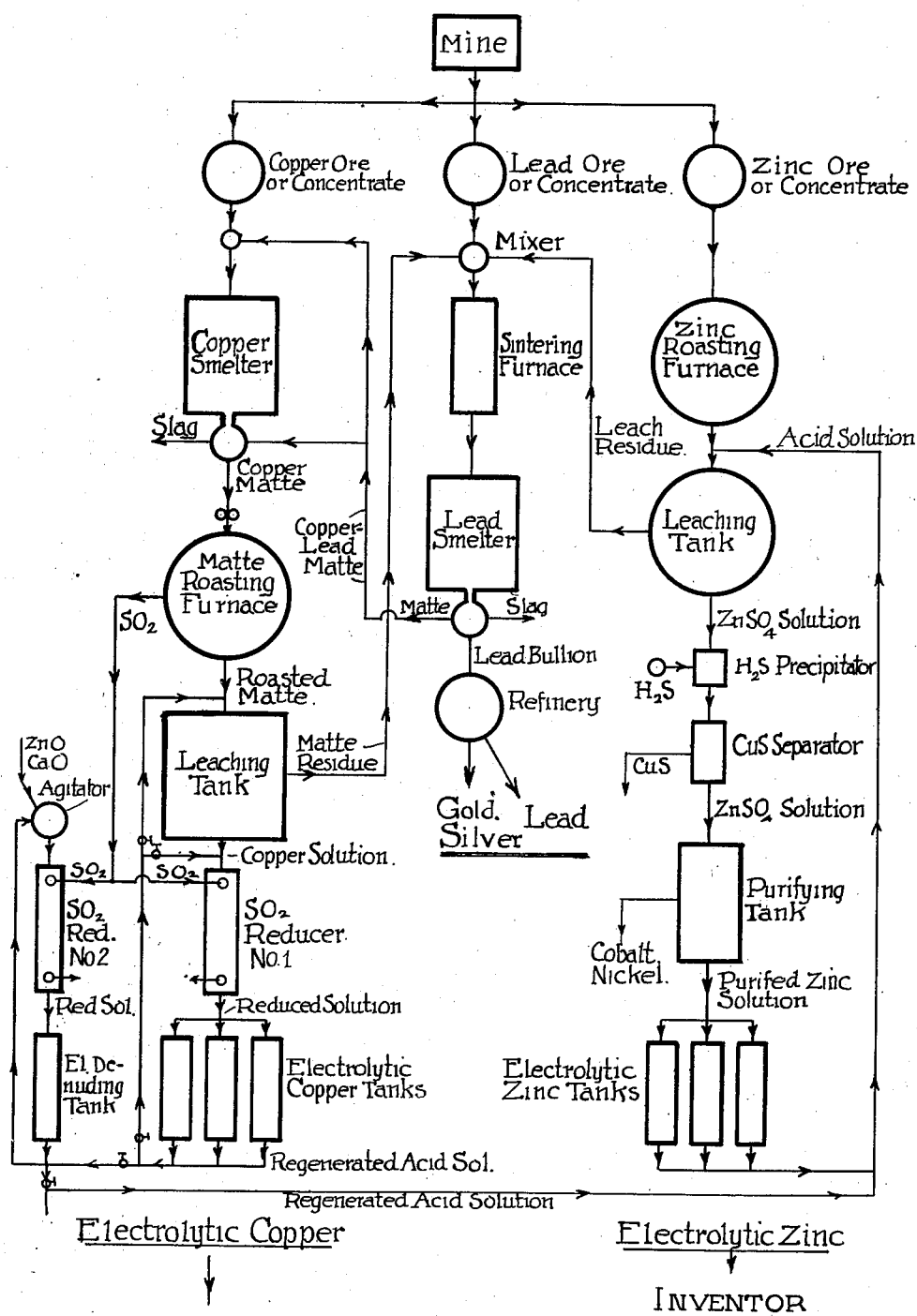
INVENTOR
William E. Greenawalt Patented June 23, 1925.

1,542,935

UNITED STATES PATENT OFFICE.

WILLIAM E. GREENAWALT, OF DENVER, COLORADO.

METALLURGICAL PROCESS.

Application filed January 31, 1924. Serial No. 689,613.

*To all whom it may concern:*

Be it known that I, WILLIAM E. GREENAWALT, a citizen of the United States, residing in the city and county of Denver and State of Colorado, have invented certain new and useful Improvements in Metallurgical Processes, of which the following is a specification.

The process refers more particularly to the treatment of complex ores which are common in the western portion of the United States, Mexico, Canada, and other parts of the world. These complex ores usually contain recoverable values in copper, lead, gold, silver, zinc, and sometimes nickel and cobalt. Sometimes the ore from one mine contains most of these metals: sometimes different mines from the same district produce ores predominating in some of these metals, while some of the other metals may be absent or present in small amounts. Practically all complex ores carry more or less iron, and the copper of the ores is usually associated with the iron and carries with it some gold and silver. Silver is usually associated with the lead and the lead may also contain gold values. Zinc frequently occurs in considerable amounts and is usually more or less associated with the lead, altho it is also often associated with the copper, and the zinc usually contains appreciable values in gold and silver. The association of the minerals of these metals is usually so intimate that it is difficult to make a satisfactory separation of them by any purely mechanical process, such as gravity concentration or flotation, although a satisfactory separation of the minerals from the gangue can usually be made, as also a more or less unsatisfactory separation of the minerals from one another.

If a complex ore is given a preliminary mechanical concentration, as is usually the case, the zinc in a galena concentrate is a great detriment, and usually involves a penalty if the galena concentrate is shipped to a smelter, and the zinc content of the galena concentrate has no commercial value if the concentrate is smelted. Similarly, the copper concentrate cannot usually be satisfactorily separated from either the lead or zinc by any mechanical process, if these metals occur in the same ore.

Again, mines in the same locality may produce widely varying ores, usually more or less complex, and no single metallurgical treatment is applicable to all. Ores containing copper and precious or other metals may be smelted to a copper matte. Ores containing lead and precious metals may be smelted to lead bullion. Zinc ores, usually containing precious metals, are harmful in either lead or copper smelting, and are preferably treated by leaching. Lead and zinc are largely lost in copper smelting. Copper, in lead smelting is concentrated into a matte or speiss. In copper smelting the precious metal values of complex ores are concentrated into a copper matte, and the usual method of refining and recovering the precious metals is to concentrate the matte, blow the matte into blister copper, and then electrolytically refine the blister copper and recover the precious metals from the anode sludge. Both the installation and operation costs of copper matte refining are practically prohibitive in ordinary mining operations. If the precious metal values are concentrated into a lead bullion, in lead smelting, the bullion may be refined at no great expense, either of installation or operation, by the Parkes process or by electrolysis.

Manifestly, any metallurgical process to be satisfactory along the lines indicated, should give the metals in relatively pure form, as the end product. The copper should preferably be in the form of the electrolytic metals, the lead should be pure enough for all ordinary purposes, and the gold and silver sufficiently pure to be acceptable to the U. S. mint. The zinc should be in the form of spelter, the electrolytic metal, or as a relatively pure chemical compound of commercial value. To operate both a copper and a lead refinery in connection with ordinary smelting operations is practically prohibitive.

It will be seen, therefore, that complex ores offer a very difficult problem for their ecconomic treatment, because a treatment which may be eminently adapted to the ores of one or more metals, may be, and usually is, totally inadequate for the ores of other metals. It is believed that the solution of the problem of the treatment of complex ores lies along the lines of an inter-related process rather than along the lines of attempting to recover all of the metals by several unrelated processes.

The present process contemplates the recovery of most, or all, of the metals in metallic form by a combination of pyro and hydro metallurgy so inter-related that the different steps form a complete whole, and may be considered as a modification of the processes described in my pending applications, Serial No. 520,241, filed December 6, 1921, No. 486,817, filed July 22, 1921, and No. 630,309, filed April 6, 1923.

The preferred method of operating the process will now be described. Reference may be made to the accompanying drawing, which represents a diagrammatic flow sheet of the process.

It has been stated that the separation of the minerals from the gangue can usually be effectively accomplished, and that the principal difficulty is in the separation of the various metals from one another, although there is no difficulty in making at least a partial separation.

The ore, as it comes from the mine, is preferably concentrated, or classified, into different products. If the ore or ores contain copper, lead, and the precious metals, it is preferably concentrated into a high grade galena containing only a small portion of copper and some of the precious metals and into a residual copper concentrate containing precious metals and composed largely of iron pyrites. It may also contain a very small amount of lead. If the ore or ores contain zinc a third concentrate is made which is high in zinc, and containing more or less copper and lead and precious metals. The treatment of the different concentrates will now be described.

*Copper concentrate.*—The copper concentrate, composed largely of iron and containing some precious metals, is smelted into a copper matte in the usual way. If the copper concentrate contains, say, 1.0% copper, 0.5 oz. gold, and 10.0 oz. silver, and the ratio of concentration by smelting is 15 into 1, with a recovery of 95% of the values, the resulting matte would contain 14.25%, or 285 lbs. of copper, 7.125 oz. gold, and 142.5 oz. silver, per ton. This matte is then crushed quite fine and roasted, preferably as described in my Patent, No. 1,468,806, Sep. 25, 1923, to convert as much as possible of the copper into the sulphate and soluble in water. The roasted material is then leached and the resulting copper sulphate solution, containing salts of iron, is electrolyzed to deposit the copper as the electrolytic metal, with the simultaneous regeneration of acid and ferric sulphate. Ferric sulphate, on account of its ability to redissolve some of the deposited copper, is harmful in the electrolyte. Ferrous sulphate is not harmful. To convert the harmful ferric iron into the harmless ferrous iron, the electrolyte is circulated between the electrolytic copper depositing tanks and a reducing chamber where the electrolyte is treated with sulphur dioxide to reduce the ferric iron to the ferrous state, and when the solution becomes sufficiently impoverished in copper, a portion of it is returned to the leaching tank to dissolve copper which is not soluble in water but is soluble in a dilute acid solution, as described more in detail in my Patent No. 1,353,995, Sep. 28, 1920, and in my pending application, Serial No. 520,241, filed Dec. 6, 1921 (Patent No. 1,483,506, Feb. 5, 1924). The sulphur dioxide, for the ferric salt reduction, may be obtained from the roasting matte.

In this treatment of the copper matte, from 75 to 85 per cent of the copper may be extracted from the roasted material, while the gold and silver remain in the residue, together with the residual copper.

In this process more acid is regenerated than that required for copper extraction; a certain amount of solution therefore has to be wasted or applied to other purposes. In either case, it is desirable to deposit the copper from the discarded solutions quite closely before wasting it or diverting it to some other use. Ferric iron is more effectively reduced in low-acid than in high-acid solutions, and if the ferric iron can be effectively reduced a high percentage of the copper can be removed from the electrolyte and with a fairly good ampere efficiency. A good electrolytic copper can be obtained, under the conditions indicated, in depositing the copper from a four or five per cent solution, down to about one per cent. Below one per cent, the copper is likely to be too impure to make a desirable end product. It is desirable, therefore, to divert a portion of the regular electrolyte— say the portion to be discarded or used for other purposes—to a separate electrolytic unit, comprising a sulphur dioxide reducer and an electrolyzer, or denuding tank. The diverted copper solution, or electrolyte, is first treated with a substance, such as zinc oxide or lime, to reduce the acidity. The solution is then flowed into the sulphur dioxide reducer No. 2, where the ferric iron is reduced to the ferrous state, and then flowed into the electrolytic copper denuding tank, and the cycle continued until the copper in the diverted solution is sufficiently extracted. In this way the copper in the solution can be removed to as low as 0.10% before the solution need be discarded, and this is a decided advantage over either iron or hydrogen sulphide precipitation of the copper in the diverted solution from the regular copper electrolytic tanks. If no further use is to be made of the electrolyzed diverted solution, the small amount of remaining copper is preferably precipitated with hydrogen sulphide and the solution wasted. If, however, the excess acid solution is to be used in zinc leaching, it is advisable to reduce the acid of the diverted copper solution with zinc oxide, obtained conveniently from roasting zinc concentrate, and then after the copper has been sufficiently removed by electrolysis, applying it to leaching of the zinc concentrate.

*Lead concentrate.*—Usually, the lead concentrate will be small in amount as compared with the copper-iron concentrate, and the idea is to accumulate all the precious metal values into a lead bullion, which can be easily and cheaply refined either chemically or electrolytically. With this in view, the roasted matte residue after leaching, and preferably without washing, or any considerable washing, is mixed with the lead concentrate, and the mixture sintered to drive off the sulphur from the galena and to agglomerate the fines, to facilitate smelting, as is well understood. Since a sinter charge should contain about 10.0% moisture for effective sintering, it will not be necessary to dry the leach matte residue. It may be mixed wet with the dry lead concentrate, and the mixture can easily be regulated to contain about the right amount of water for sintering.

In lead smelting of the lead concentrate and copper matte leach residue the precious metals will be largely concentrated into the metallic lead, and the lead bullion will contain most of the precious metal values contained in both the copper and lead ore or concentrate. In the lead smelting, there will also be formed a certain amount of copper matte, or copper-lead matte, containing also a small amount of precious metal values. This copper-lead matte is preferably mixed with the copper ore or concentrate and smelted to recover the copper and precious metals in a new matte, while the lead of the lead-copper matte will be largely or mostly volatilized. It is difficult to effectively leach a roasted copper-lead matte, while the leaching of a roasted ordinary copper matte does not present any unusual difficulty.

It will be seen that by this method of operation the copper of a complex ore may be recovered as the electrolytic metal at no excessive cost of plant installation, while the precious metals are concentrated into a lead bullion, which can be easily and cheaply refined to give a marketable lead, and the precious metals in form sufficiently pure to be acceptable to the U. S. mint.

The process, it is believed, is best applicable to comparatively small smelting and leaching operations, producing, say, from one to ten tons of copper per day, since in such small units the ordinary conversion of copper matte to blister copper and the electrolytic refining of the blister copper to recover the copper as the electrolytic metal and the gold and silver from the anode sludge, would be quite impractical metallurgically and prohibitive financially.

*Zinc concentrate.*—If the complex ore contains zinc, the zinc concentrate may be roasted and leached in the usual way, and the zinc recovered as a chemical compound, such as the sulphate, or as the electrolytic zinc. The residue, containing lead and precious metals may be added to the lead-copper-matte-residue charge and sintered and smelted, whereby the lead and precious metals are recovered as a portion of the lead bullion. In carrying out this process, the acid solution from the copper matte leaching and electrolysis is preferably used, and the excess acid neutralized on the roasted zinc concentrate. The copper in the zinc solution is preferably precipitated with hydrogen sulphide, and the resulting copper sulphide precipitate may be smelted with the copper concentrate and the copper ultimately recovered as the electrolytic metal.

If the zinc concentrate contains a small amount of copper, the acid solution from copper leaching and electrolysis which is used in zinc leaching, will extract the small amount of copper from the zinc concentrate with the zinc. When hydrogen sulphide is applied to this solution, both the copper from the copper leaching and the copper from the zinc leaching are precipitated as copper sulphide.

Since it is desirable to have about 10% water in the mixture for sintering for lead smelting, and since the residual copper in the roasted matte after leaching is concentrated into the copper-lead matte in lead smelting, it will not be necessary to wash, or at least thoroughly wash, the leached roasted copper matte residue on adding it to the sinter mixture for lead smelting, so that there will be no excess dilute washwater, as such, from which the copper has to be chemically precipitated as in ordinary copper leaching. Only sufficient washwater is preferably added to take the place of that diverted as foul or denuded electrolyte and that lost by evaporation.

The amount of copper which it may be advisable to extract from the roasted matte by leaching is necessarily optional with the operator, and when he thinks that sufficient copper has been extracted for satisfactory results for both leaching and smelting, the roasted matte leach residue is transferred to the lead ore to form the lead smelting mixture.

By the process described, large quantities of acid can be produced from the roasted copper matte leaching available for zinc leaching. By proper roasting, from 50 to 75 per cent of the copper in the roasted matte can be made soluble in water, as the sulphate. The remaining copper in the roasted matte is soluble, to a good percentage, in dilute acid, with an acid consumption not greatly exceeding the theoretical, or practically, about 1.75 lbs. of acid, per lb. of copper so extracted. The excess acid produced with a matte containing 300 lbs. of extractible copper, with 50% of the copper in the roasted matte soluble in water, would be about as follows:

150 lbs. copper × 1.75 lbs. acid consumed_____ 263 lbs. acid.
300 lbs. copper × 3.0 lbs. acid per lb. produced_ 900 lbs. acid.

Excess acid, per ton matte_____ 637 lbs.

This excess acid may then be applied to roasted zinc ore to extract the zinc. Experience has shown that about 3.0 lbs. of acid can be regenerated, per lb. copper deposited, using sulphur dioxide as a reducing agent in the electrolytic deposition of the copper. If the zinc is deposited electrolytically, the acid regenerated by the deposition of the zinc and the excess acid regenerated by the deposition of the copper from the copper solution, will ordinarily make the zinc leaching self sustaining in acid, so that no acid would have to be purchased or especially manufactured to extract the zinc from the ore.

The copper sulphide precipitate may be added to the copper ore for smelting or to the copper matte or applied to the electrolyte and the copper also recovered as the electrolytic metal in the regular operation of the process.

I claim:

1. A process of treating copper and lead ores containing precious metals comprising, smelting the copper ore to matte, crushing the matte, roasting the matte, leaching the roasted matte with a dilute acid solution to extract a portion of the copper, electrolyzing the resulting copper solution to deposit the copper and regenerate acid, returning the regenerated acid solution to the roasted matte and repeating the cycle until the copper in the roasted matte is sufficiently extracted, then mixing the roasted matte leach residue containing the precious metals and a small amount of copper with the lead ore, smelting the mixture whereby the major portion of the precious metal values are concentrated into a lead bullion and the minor portion into a lead-copper matte, and adding the lead-copper matte so obtained to a new copper ore charge for copper matte smelting, and repeating the cycle.

2. A process of treating copper and lead ores containing precious metals comprising, smelting the copper ore to matte, crushing the matte, roasting the matte, leaching the roasted matte with a dilute acid solution to extract a portion of the copper, electrolyzing the resulting copper solution to deposit the copper and regenerate acid, returning the regenerated acid solution to the roasted matte and repeating the cycle until the copper in the roasted matte is sufficiently extracted, then mixing the roasted matte leach residue containing the precious metals and a relatively small amount of copper with the lead ore, smelting the mixture whereby the major portion of the precious metal values in both the copper and lead ore is converted into a lead bullion.

3. A process of treating copper and zinc ores containing precious metals comprising, smelting the copper ore to matte, crushing the matte, roasting the crushed matte, leaching the roasted matte with a dilute acid solution to extract a portion of the copper, electrolyzing the resulting copper solution to deposit the copper and regenerate acid, returning the regenerated acid solution to the roasted matte and repeating the cycle until the copper in the roasted matte is sufficiently extracted and the acid solution sufficiently impoverished in copper, then applying the excess regenerated acid solution obtained from leaching and electrolysis in the treatment of the roasted matte to the roasted zinc ore to neutralize the excess acid and extract the zinc, and recovering the zinc from the resulting leach solution.

4. A process of treating copper, lead, and zinc ores containing precious metals comprising, smelting the copper ore to matte, crushing and roasting the matte, leaching the roasted matte with a dilute acid solution to extract the copper, electrolyzing the resulting copper solution to deposit the copper and regenerate acid, returning the regenerated acid solution to the roasted matte and repeating the cycle until the copper in the roasted matte is sufficiently extracted and the solution sufficiently impoverished in copper, applying the regenerated acid solution obtained from the treatment of the roasted matte to the roasted zinc ore and recovering the zinc from the resulting zinc leach solution, mixing the roasted matte leach residue with the lead ore and smelting the mixture to recover the precious metals of the mixture in a lead bullion.

5. A process of treating copper and zinc ores comprising, roasting the zinc ore, smelting the copper ore to matte, crushing and roasting the matte, leaching the roasted matte with dilute acid solution to extract the copper, electrolyzing the resulting copper solution to deposit the copper and regenerate acid, returning the regenerated acid solution to the roasted matte and repeating the cycle until the copper in the roasted matte is sufficiently extracted, diverting a portion of the copper electrolyte from the main circuit of leaching and electrolysis, treating the diverted portion of the electrolyte with zinc oxide or roasted zinc ore to reduce the acidity of the solution and again electrolyzing the solution to deposit a portion of the remaining copper.

6. A process of treating sulphide copper bearing material comprising, roasting the material, leaching the roasted material with dilute acid solution, alternately subjecting the resulting copper solution containing salts of iron to the action of sulphur dioxide and to the action of the electric current to deposit a portion of the copper and regenerate acid, returning a portion of the regenerated acid solution to the roasted material and repeating the cycle, diverting another portion of the solution from the roasted material leaching and electrolytic circuit, reducing the acidity of the diverted portion of the copper solution and again subjecting the diverted portion of the copper solution to the alternate action of sulphur dioxide and to the action of the electric current to deposit another portion of the copper.

7. A process of treating copper bearing sulphide material comprising, roasting the material, leaching the roasted material with a dilute acid solution, alternately subjecting the resulting copper solution containing salts of iron to the action of a reducing agent and to the action of an electric current to deposit a portion of the copper and regenerate acid, returning a portion of the regenerated acid solution to the roasted material and repeating the cycle, diverting another portion of the solution from the roasted material leaching and electrolytic circuit, reducing the acidity of the diverted portion of the copper solution and again subjecting the diverted portion of the copper solution to the alternate action of a reducing agent and to the electric current to deposit another portion of the copper, and then applying a chemical precipitant to the electrolyzed solution to precipitate the remaining copper.

8. A process of treating copper and lead ores containing precious metals comprising, smelting the copper ore to matte, crushing the matte, roasting the matte, leaching the roasted matte with a dilute acid solution to extract a portion of the copper, electrolyzing the resulting copper solution to deposit the copper and regenerate acid, returning the regenerated acid solution to the roasted matte and repeating the cycle until the copper in the roasted matte is sufficiently extracted, then mixing the roasted matte leach residue containing the precious metals and small amounts of water soluble and insoluble copper with the lead ore, smelting the mixture whereby the major portion of the precious metal value in both the copper and lead ore is converted into lead bullion and the minor portion into a lead-copper matte.

9. A process of treating copper and lead ores containing precious metals comprising, smelting the copper ore to matte, crushing the matte, roasting the matte, leaching the roasted matte with a dilute acid solution to extract a portion of the copper, electrolyzing the resulting solution to deposit the copper and regenerate acid, returning the regenerated acid solution to the roasted matte and repeating the cycle until the copper in the roasted matte is sufficiently extracted, diverting a portion of the copper solution from the leaching and electrolytic circuit to maintain the copper electrolyte at a normal standard of impurities and applying only sufficient washwater to the leached roasted matte residue to supply the loss due to discard and evaporation, then mixing the roasted matte leach residue containing the precious metals with the lead ore, and smelting the mixture to recover the precious metal value in both the copper and lead ore in a lead bullion.

10. A process of treating copper lead and zinc ores containing precious metals comprising, smelting the copper ore to matte, crushing the matte, roasting the matte, leaching the roasted matte with a dilute acid solution to extract a portion of the copper, electrolyzing the resulting copper solution to deposit the copper and regenerate acid, returning the regenerated acid solution to the roasted matte and repeating the cycle until the copper in the roasted matte is sufficiently extracted, roasting the zinc ore, applying the excess acid solution from the roasted copper matte leaching to the roasted zinc ore to extract the zinc, recovering the zinc from the resulting zinc solution, adding the roasted copper matte leach residue and zinc ore leach residue to the lead ore and smelting the mixture to obtain the precious metal values of the original copper, lead, and zinc ore into a lead bullion and the residual copper in a copper-lead matte.

11. A process of treating ores containing copper and zinc comprising, roasting the copper ore, smelting the copper ore to matte, roasting the matte to make a portion of the copper soluble in water, leaching the roasted matte with a dilute acid solution to extract a portion of the copper, electrolyzing the resulting solution to deposit the copper and regenerate acid, returning a portion of the regenerated acid solution to the roasted matte, and applying another portion to the roasted zinc ore to extract the zinc.

WILLIAM E. GREENAWALT.